United States Patent [19]

Rogers

[11] 4,362,097

[45] Dec. 7, 1982

[54] APPARATUS FOR DETERMINING WEIGHT OF CYLINDRICAL HAY BALES

[76] Inventor: Laurence J. D. Rogers, Rte. 1, Box 230, Checotah, Okla. 74426

[21] Appl. No.: 221,025

[22] Filed: Dec. 29, 1980

[51] Int. Cl.³ ............................................. B30B 15/00
[52] U.S. Cl. ...................................... 100/99; 100/88; 177/136
[58] Field of Search ....................... 100/99, 88, 89, 76; 56/341–343; 177/136, 137, 138, 208

[56] References Cited

U.S. PATENT DOCUMENTS

| | | | |
|---|---|---|---|
| 1,147,128 | 7/1915 | Troll | 177/137 X |
| 2,993,546 | 7/1961 | Slattery | 100/99 X |
| 3,126,069 | 3/1964 | Shepley | 177/136 |
| 3,172,492 | 3/1965 | Sobotka et al. | 177/136 |
| 4,206,506 | 6/1980 | Lundahl et al. | 177/136 X |
| 4,246,743 | 1/1981 | Anstee et al. | 100/99 X |

FOREIGN PATENT DOCUMENTS 493815  4/1976  Australia ............................... 100/99

Primary Examiner—Peter Feldman
Attorney, Agent, or Firm—Head, Johnson & Stevenson

[57] ABSTRACT

An apparatus for use in combination with a cylindrical bale hay baler for efficiently determining the weight of the bale and comprising a lever assembly secured between the baler body and at least one of the support wheels thereof for yieldably supporting the baler body with respect to the wheel, a sensing device interposed between the body and the lever assembly for detecting vertical deflection of the body with respect to the wheel engaging the surface of the ground, and a weight indication device operably connected with the sensing device for providing a continual visual indication of the weight of the hay bale whereby the weight of the hay bale may be substantially accurately determined at any desired time during the baling operation.

5 Claims, 5 Drawing Figures

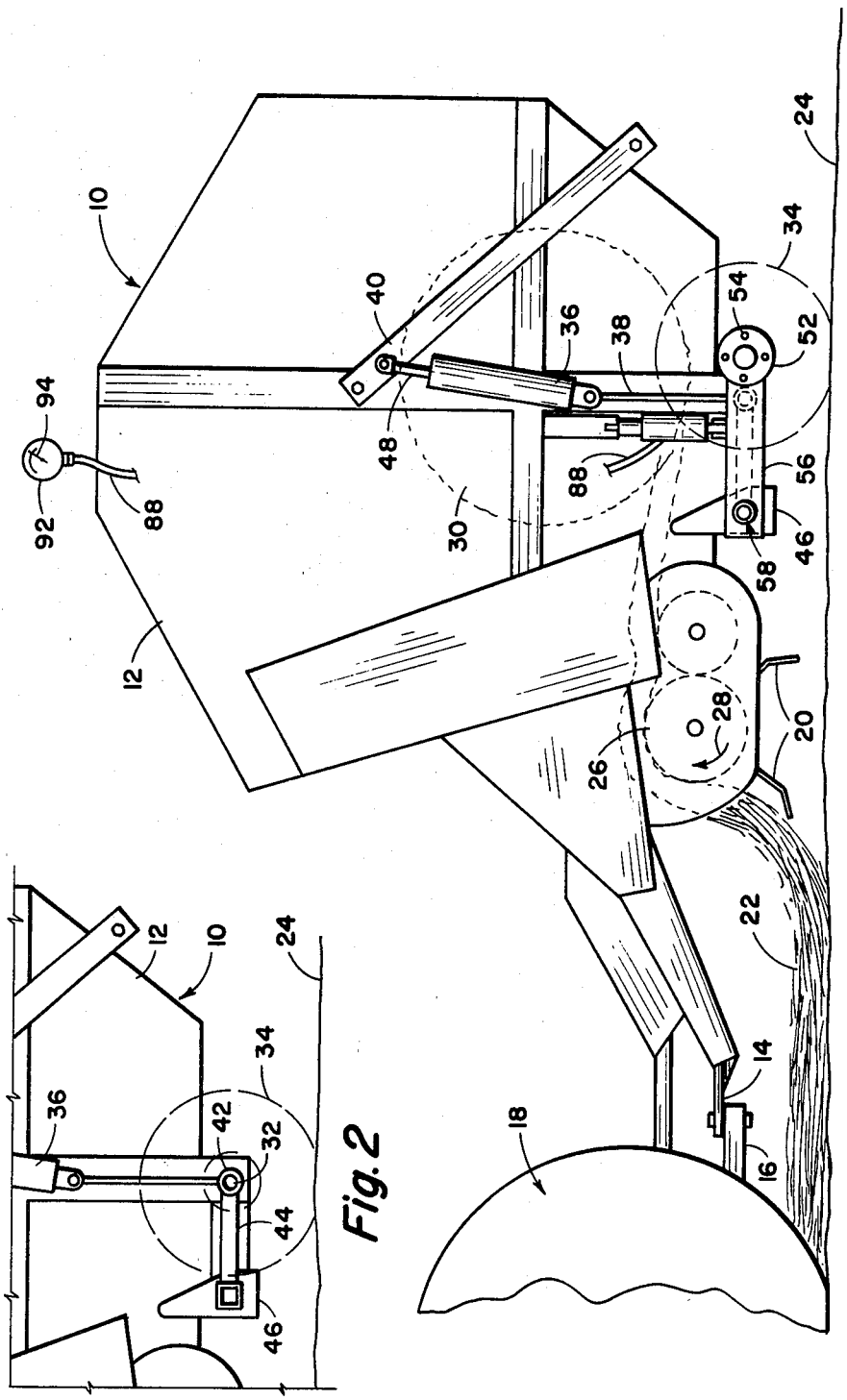

APPARATUS FOR DETERMINING WEIGHT OF CYLINDRICAL HAY BALES

BACKGROUND OF THE INVENTION

1. Field of the Invention

This invention relates to improvements in hay baling equipment and more particularly, but not by way of limitation, to means for substantially accurately determining the weight of a cylindrical hay bale during the baling thereof.

2. Description of the Prior Art

In recent years it has become common place to bind bales of hay in circular or cylindrical bales through the use of automated hay baling equipment. These cylindrical or circular hay bales are usually either left in the field at the site of the baling thereof, or retrieved for storage at a common site. The hay bales are normally sold by weight, and since these bales are usually quite large, as for example five to six feet in diameter and five to six feet in length, and are quite heavy, weighing approximately 800 to 1600 pounds each, the determination of the actual weight thereof is quite difficult. As a result, the present day practise is to calculate the weight of the bale by guess work related to the overall physical size of the bale. Of course, it will be readily apparent that the state of compactness of the bales will greatly affect the overall weight thereof, and the usual guess work for determining the weight of these bales is not exceptionally accurate. This results in either an over charging or under charging for the sale of the bale, either of which is detriment.

SUMMARY OF THE INVENTION

The present invention contemplates a novel apparatus for weighing cylindrical hay bales in a manner overcoming the foregoing disadvantages. The novel apparatus comprises a lever means having one end thereof pivotally secured to the body of substantially any cylindrical bale hay baler, and the opposite end thereof in supporting engagement with at least one wheel of the hay baler whereby the body of the hay baler is yieldably supported by the wheel. A sensing means is carried by the lever means and is connected with the body of the baler in such a manner as to detect vertical fluctuations or deviations of the body with respect to the supported position of the wheel against the surface of the earth, or the like. A suitable gauge means is operably connected with the sensing means for providing a visual indication of the weight of the contents of the baler body during a baling operation, thus providing a continual indication of the weight of the bale being formed within the body. In this manner, a substantially accurate determination of the weight of the hay bale is provided at substantially any step of the baling operation. The baling operation may be ceased when the desired weight for the bale has been achieved, or the baling operation may be continued until the desired size for the bale has been achieved. In any event, the accurate weight of the bale will be indicated by the gauge means. The novel apparatus is simple and efficient in operation and economical and durable in operation.

BRIEF DESCRIPTION OF THE DRAWINGS

FIG. 1 is a side elevational view of a cylindrical or other large and/or heavy bale hay baler having a bale weighing apparatus embodying the invention installed thereon, with portions shown in broken lines for purposes of illustration.

FIG. 2 is a side elevational view of a portion of the cylindrical bale hay baler shown in FIG. 1 with the weighing apparatus of the invention eliminated therefrom, and illustrated on a smaller scale.

DETAILED DESCRIPTION OF THE PREFERRED EMBODIMENT

Figure 3:
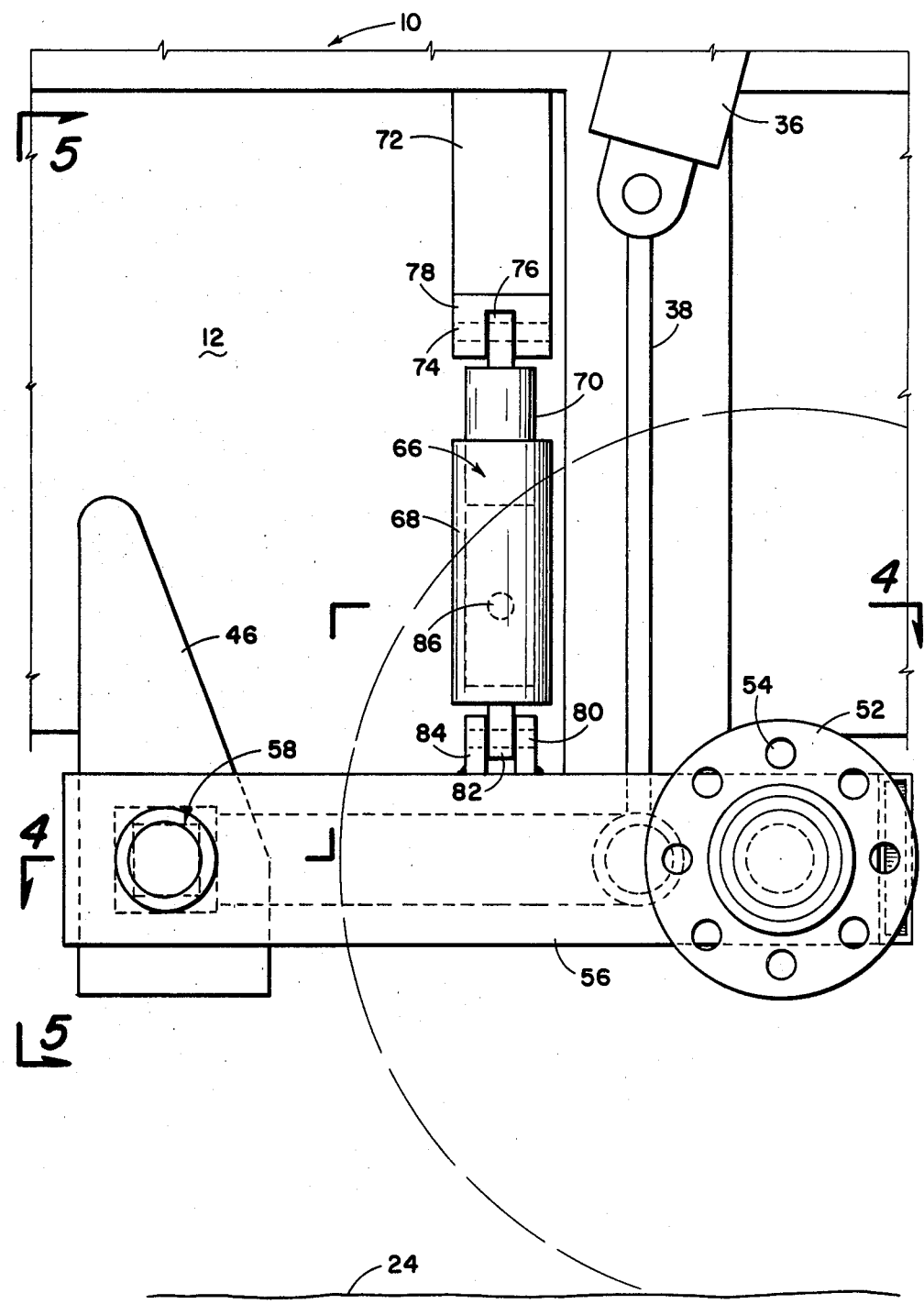
FIG. 3 is an enlarged side elevational view of the weighing apparatus embodying the invention as shown in FIG. 1, with a portion of the cylindrical bale hay baler included.
Figure 4:
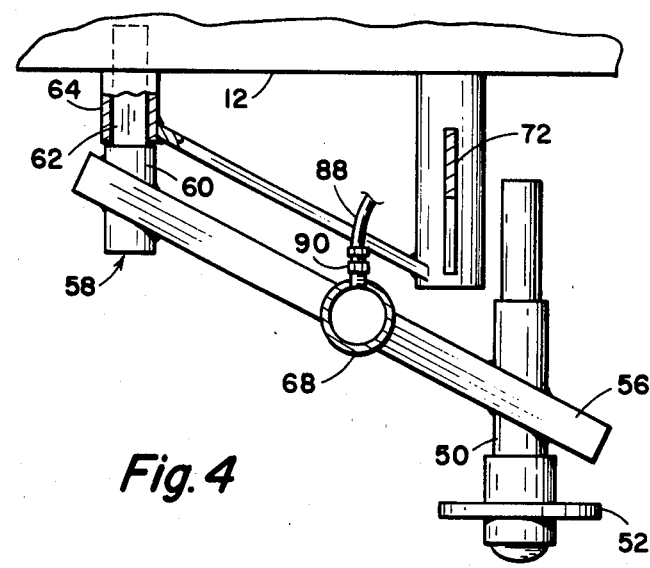
FIG. 4 is a view taken on line 4—4 of FIG. 3.
Figure 5:
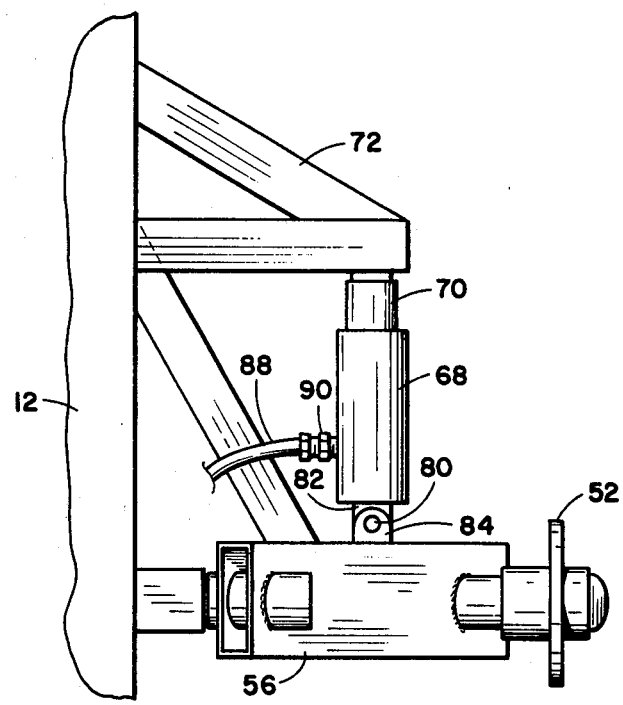
FIG. 5 is a view taken on line 5—5 of FIG. 3.

Referring to the drawings in detail, reference character 10 generally indicates a cylindrical bale hay baler of any suitable type, such as the round balers sold by Vermeer Manufacturing Company, which normally comprises a hollow body 12 having suitable hitch means 14 for connection with the tow bar means 16 of a suitable towing vehicle generally indicated at 18. Suitable pickup teeth 20 are provided in the proximity of the forward or leading end of the body 12 to pick up hay 22 from the surface of the ground 24. The teeth 20 lay the picked up hay on first roller means 26 which turns in the direction indicated by the arrow 28 for moving the hay in a direction toward the rear or back of the body 12. Suitable belt means (not shown) is normally provided in the body 12 for reversing the direction of movement of the hay for bringing the hay into engagement with a starting roller (not shown). The starting roller lays the hay on top of other hay coming into the body 12, thereby starting the rolling action for the ultimate hay bale 30 as shown in broken lines in FIG. 1. As more hay is gathered in the body 12, the bale 30 grows, and the belt means (not shown) keeps the bale encircled for an efficient rolling of the bale. Of course, when the bale 30 has reached the desired size and/or weight, the bale 30 is usually wrapped with twine (not shown), or the like, and discharged from the baler 10.

The body 12 is normally supported by a suitable transversely extending axle means 32 (FIG. 2) having suitable support wheels 34 (only one of which is shown in the drawings) journalled on the opposite ends thereof. In addition, it is the usual practice to mount a hydraulic cylinder 36, or the like, outboard of the body 12 on at least one side thereof, with the cylinder 36 being operably connected between a support rod 38 and a brace member 40. The outer end of the support rod 38 is pivotally secured to the axis 32 by a suitable journal means 42 which may be secured to the body 12 by an arm 44 secured to a bracket member 46. The brace member 40 is normally operably connected with a gate member (not shown) provided on the rear of the body 12. The cylinder 36 is usually operably connected with the fluid system of the towing vehicle 18 through suitable conduits or fluid lines (not shown) and the normal extension and contraction of the piston rod 48 of the cylinder 36 alternately opens and closes the gate (not shown) as is well known. In the closed position, the gate forms the rear wall of the body 12, and in open position, the gate provides an outlet for discharge of the bale 30 from the body 12.

The wheels 34 in the present instance are each mounted on a spindle 50 which may be inserted into the respective open end of the axle 32 for journalling the wheels 34 on the axle. Each spindle is provided with an outwardly extending circumferential flange 52 having a plurality of spaced bores 54 therein. The wheels 34 are bolted or otherwise secured to the flange 52. At least one of the spindles is removed from the engagement with the axle 32, and is welded or otherwise rigidly secured in the proximity of the outer end of a lever arm 56. The opposite end of the lever arm 56 is suitably pivotally secured to a stub shaft 58. The stub shaft 58 comprises a substantially cylindrical portion 60 rigidly secured to or integral with a shank 62 of substantially square cross sectional configuration. The shank 62 is inserted in the open end of a square tubing member 64 which is carried by or rigidly secured to the bracket 46. In this manner, the lever arm 56 yieldably secured the wheel 34 to the body 12 for a purpose as will be hereinafter set forth. It is to be noted that both wheels 34 may be similarly secured to the body 12, if desired.

A suitable sensing means 66 is carried by the lever arm 56 for sensing deflection of the body in a vertical direction with respect to the wheel or wheels 34 which rest on the surface of the ground 24. As shown herein, the sensing means 66 comprises a hydraulic cylinder 68 having a reciprocal rod 70 extending axially outwardly from one end thereof. The outer end of the rod 70 is pivotally secured to a bracket means 72 in any suitable manner, such as by a pivot pin 74 extending through and between a suitable clevis 76 and yoke member 78. The bracket 72 is rigidly secured to the outer wall of the body 12 in any well known or suitable manner and preferably extends outwardly therefrom substantially perpendicular with respect to the plane of the sidewall of the body 12. The outer end of the cylinder 68 is pivotally secured to the lever arm 56 in any suitable manner, such as by a pivot pin 80 extending through and between a clevis member 82 and yoke member 84. The cylinder 68 is provided with a port 86 in the sidewall thereof and a conduit of fluid line 88 is connected to the port 86 by suitable fitting means 90 wherein the interior of the line 88 is in constant open communication with the interior of the cylinder 68. A fluid reservoir is provided within the cylinder 68 and placed beneath or below the inner end of the rod 70 for receiving a suitable non-compressible fluid therein. It is preferable that the fluid reservoir be completely filled with the fluid, as well as the fluid line 88. Thus, when the rod 70 is moved inwardly with respect to the cylinder 68, the fluid will be moved through the line 88 for creating an increase in fluid pressure at the outer end thereof and when the rod 70 is extended with respect to the cylinder 68, the fluid will be withdrawn into the fluid reservoir for decreasing the fluid pressure at the outer end of the line 88, for a purpose as will be hereinafter set forth.

A suitable weight indicator means 92 is operably connected to the outer end of the conduit 88 and may be of any well known type which provides a constant visual indication of weight. As shown herein, for example, the indicator means 92 comprises a dial-type gauge of any well known type which may be set at a preselected "zero" position whereby incremental movement of the indicator hand 94 of the gauge provides an indication of weight. The indicator element or hand 94 is responsive to pressure fluctuations for indicating weight, and may be mounted in any suitable location for ease of visibility by the operator of the apparatus during a hay baling operation. For example, the gauge or indicator means 92 may be mounted on the body 12, preferably extending thereabove, for ready visual access by the operator of driver of the vehicle 18, or on the cab section or other portion of the towing vehicle.

During a hay baling operation, the hay baler 10 is moved across the surface 24 of the ground in the usual manner whereby the hay lying on the surface is gathered into the interior of the body 12 in the usual manner and as hereinbefore set forth. As the hay accumulates within the body, the pressure or force of the body carried by the axle will cause the body 12 to move vertically downwardly. The wheels 34, being in engagement with the surface 24, remain in the same vertical position, thus holding the lever arm 56 in the same relative vertical position. Thus, in effect, the wheels 34 are raised with respect to the body, or the body 12 is lowered with respect to the wheels. As the body 12 moves downwardly, the bracket means 72 moves the piston or rod 70 axially inwardly with respect to the cylinder 68, thus displacing the fluid in the internal reservoir within the cylinder. This causes the pressure fluid within the conduit 88 to rise, thus changing the pressure at the weight indicator means 92. As the pressure at the weight indicator means increases, the hand 94 moves in a direction to indicate an increase of the weight of the hay within the body 12. When the weight indicated by the hand 94 reaches the desired or preselected weight for the hay bale 30, the baling operation may be ceased, and the bale removed from the body 12 in the usual or well known manner.

In the event the bale 30 is to be completed to a preselected dimension rather than to a preselected weight, of course, the baling operation may be continued until the bale reaches the desired size. At this point, the hand 94 will indicate the weight of the bale, thus providing for a more efficient determination for the selling price thereof, or the like.

From the foregoing it will be apparent that the present invention provides a novel apparatus for continually indicating the weight of a cylindrical hay bale during a hay baling operation. The novel apparatus provides a sensing means responsive to vertical deflection of the body of the baler during the hay baling operation, said sensing means activating a weight indicating means whereby the weight of the hay bale accumulating within the baler is visually ascernible at all times. Thus, a cylindrical or round hay bale may be substantially accurately weighed for providing more efficient selling thereof, or the like.

What is claimed is:

1. In combination with a cylindrical bale hay baler, weight indicating apparatus for determining the weight of the bale as the bale accumulates on the baler and comprising lever means pivotally secured directly between the hay baler itself and at least one support wheel thereof with minimum alteration of the existing structure of the hay baler for yieldable supporting the hay baler from said wheel, sensing means secured to the lever means substantially centrally disposed between the opposite ends thereof and operably connected with the hay baler itself for response to vertical fluctuations of the hay baler during a hay baling operation, and weight indicating means operably secured to the sensing means for actuation thereby upon vertical fluctuations of the hay baler to provide a continual indication of the weight of the bale during the baling operation.

2. In combination with a cylindrical bale hay baler, weight indicating apparatus as set forth in claim 1 wherein the sensing means comprises hydraulic cylinder means having a housing and reciprocal piston, the housing being pivotally secured to the lever means and the piston being operably secured to the hay baler itself, a fluid chamber provided in the housing for displacement upon reciprocation of the piston therein, pressure fluid provided in the chamber, conduit means in open communication between the fluid chamber and the weight indicating means whereby the fluid pressure at the weight indicating means varies in accordance with the actuation of the piston during said vertical fluctuation of the hay baler.

3. In combination with a cylindrical bale hay baler, weight indicating apparatus as set forth in claim 2 and including bracket means secured between the hay baler itself and the piston for actuation of the sensing means upon said vertical fluctuation of the hay baler.

4. In combination with a cylindrical bale hay baler, weight indicating apparatus as set forth claim 1 wherein the weight indicating means comprises fluid actuated gauge means providing constant visual indication of the weight of the bale during the hay baling operation.

5. In combination with a cylindrical bale hay baler, weight indicating apparatus as set forth in claim 1 wherein the lever means comprises a lever arm secured between the hay baler itself and the support wheel for securing the wheel to the baler independently of any other connection therebetween.

* * * * *